Sept. 4, 1945.  T. W. SUKUMLYN  2,384,209
METHOD OF PRODUCING OPTICAL WEDGES
Filed July 13, 1940   2 Sheets—Sheet 1
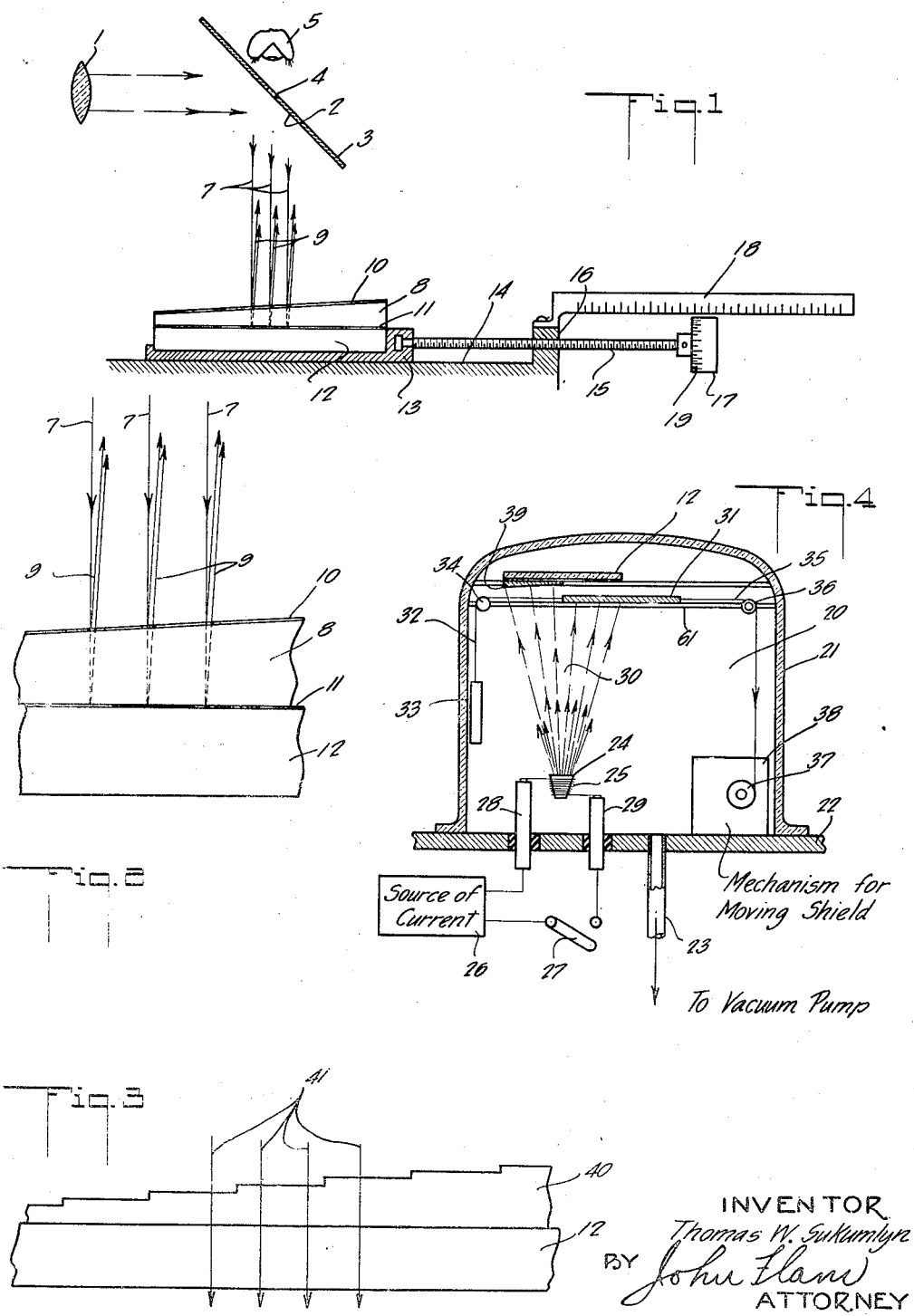

Sept. 4, 1945. T. W. SUKUMLYN 2,384,209
METHOD OF PRODUCING OPTICAL WEDGES
Filed July 13, 1940 2 Sheets—Sheet 2
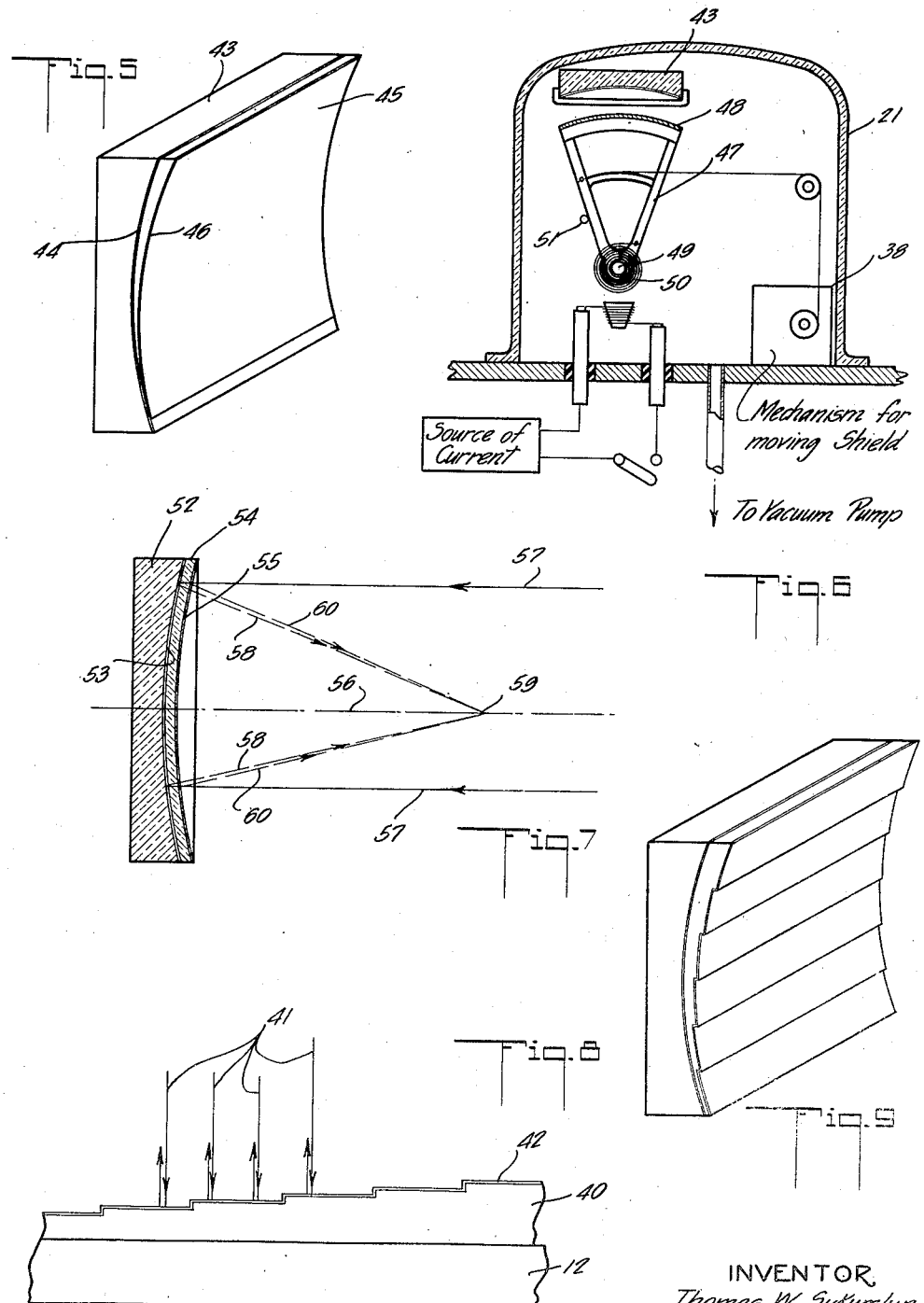
INVENTOR,
Thomas W. Sukumlyn
BY John Flam
ATTORNEY Patented Sept. 4, 1945

2,384,209

UNITED STATES PATENT OFFICE 2,384,209

METHOD OF PRODUCING OPTICAL WEDGES

Thomas W. Sukumlyn, Los Angeles, Calif.

Application July 13, 1940, Serial No. 345,361

2 Claims. (Cl. 117—106)

This invention relates to optics, and more particularly to apparatus that may be utilized for spectroscopes or interferometers, or for the measurement of the wave length of light, or the like, and to processes for making such apparatus.

Methods of measuring wave lengths of light often involve the phenomenon of interference. An interferometer is so arranged, for this purpose, that several optical paths from a common source of light differ by an odd multiple of half wave lengths, so that the rays received neutralize each other at the point of observation. The path differences may be obtained by inserting in one path, a transparent medium of greater density than air, such as glass, which retards the transmission of the light; or by providing a longer air path for the beams. By appropriate adjustments, the phase difference between the individual rays may be so set that complete interference is obtained and from these adjustments, the wave length of the light may be deduced.

These methods have been utilized with some success in the past. Since the wave of monochromatic light is extremely small, it has not been possible to provide sufficiently thin transparent media that would add but a few wave lengths to the path of the rays. It is one of the objects of this invention to make it possible to provide extremely thin transparent media for use in optics of the order of only a few wave lengths in thickness.

It is another object of this invention to make it possible to measure the wave length of light by simpler and more exact methods.

Gratings for interferometer purposes have sometimes been made of echelon or stepped form, the optical path differences between the steps representing a very large number of wave lengths. Such echelon gratings therefore produced a considerable dispersion of the spectrum, since the order of the spectrum is a function of the path difference between the steps. It is advantageous for some purposes of spectroscophy to provide an echelon grating that produces a lower order of spectrum (obtainable by reducing the distance between the steps of the echelon), and yet obtain an order of spectrum higher than is obtainable by an ordinary diffraction grating. By the aid of the present invention, the echelon grating can be so made that the differential thickness between the steps can be made very small, and the order of the spectrum can be kept low.

In order to obtain these results, use is made of a method of obtaining thin layers of transparent material, as by depositing vaporized particles on a suitable backing. For this purpose quartz or flurite may be used, and by appropriate manipulation of the apparatus, the quartz may be deposited to form layers of any desired depth or graduated depth.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a diagram illustrating one form of apparatus that may be utilized in practicing the invention;

Fig. 2 is an enlarged fragmentary view of a portion of the apparatus illustrated in Fig. 1;

Fig. 3 is a fragmentary view of an echelon grating constructed in accordance with the invention;

Fig. 4 is a diagram of apparatus for making the optical elements in accordance with the invention;

Fig. 5 is a pictorial view of an optical wedge incorporating the invention;

Fig. 6 is a view similar to Fig. 4 illustrating the apparatus for producing the optical wedge of Fig. 5;

Fig. 7 is a diagram illustrating another form of the invention;

Fig. 8 is a diagram similar to Fig. 3 of another form of echelon grating incorporating the invention; and Fig. 9 is a pictorial view of another form of optical wedge incorporating the invention.

In the diagram of Fig. 1 a method and means for measuring the wave length of light is illustrated. It may be assumed that monochromatic light is passed through a lens system indicated diagrammatically at 1. This light is passed in a parallel beam to the lower reflecting surface 2 of a reflector 3. This reflector 3 has an aperture 4. Through this aperture 4 the eye 5 of an observer may be sighted to determine when there is maximum interference between rays of light, produced as hereinafter described.

The rays 7, reflected from surface 2, pass downwardly from the reflector 3 to impinge upon an optical wedge structure 8. Although these rays 7 are shown as spread substantially, it is to be understood that they are quite closely confined to a region immediately opposite the viewing aperture 4. Only those rays which are thus closely confined are of utility in the manipulation of the apparatus. The wedge structure 8 is provided with reflecting top and bottom surfaces as hereinafter explained.

The optical wedge structure may be formed of quartz in a manner to be hereinafter described. It is characterized by the fact that it is formed as an extremely thin wedge, the thickness of which is greatly exaggerated in the diagram. The upper and lower surfaces of this member 8 form an angle that is extremely acute; of the order of several seconds of arc. The diagram greatly exaggerates this angle. At least some of the light incident upon the upper surface of the wedge 8 is reflected upwardly toward the aperture 4 where the effect of the reflected light may be observed by the eye 5. In Figs. 1 and 2 the incident rays 7 are shown slightly displaced from the reflected rays 9 for the sake of clarity; it being understood, however, that these rays 9 fall substantially in line with the rays 7.

The upper surface of the wedge 8 is provided with an extremely thin metallic layer 10, as by evaporating a metal thereon. This layer serves partly as a reflecting layer and partly as a layer through which some light can pass downwardly through the wedge 8. The lower surface of the wedge 8 may be similarly coated with a reflected layer 11 from which substantially all of the light incident upon the reflector 11 is reflected.

The rays 9 which are reflected from the upper surface 10 and similar rays 9 which are reflected from the lower reflecting layer 11, interfere and neutralize each other, producing minimum illumination at the eye if certain conditions are fulfilled. The thickness should be such that the transmitted and returned ray is an odd number of half wave lengths behind the ray reflected from the first surface. This condition may be secured by adjustment of the wedge 8 in a direction transverse to the beam 8. The movement of the wedge 8 from a position where the reflections from the two surfaces 10 and 11 are brought from an in-phase condition to one in which they are in direct opposition, is quite large, due to the very gradual change of wedge thickness opposite the bundle of rays 7.

In order therefore to measure the wave length it is necessary merely to provide appropriate scales indicating the amount of movement required for adjusting the wedge 8 from a position where there is maximum interference to a succeeding position where there is again maximum interference. Movement of the wedge between these two positions corresponds to an increase or decrease in the thickness of the wedge where the rays 7 are incident, corresponding to the length of a wave of the light being measured.

For making these measurements, the wedge 8 is shown as supported upon a block 12 mounted on a base 13 movable on a plane surface 14. For moving the base 13, a long screw 15 is shown as threaded in an ear 16 formed on a stationary support, and rotatably attached to the base 13. The screw 15 carries a manipulating wheel 17. One edge of this wheel 17 is adapted to cooperate with a stationary scale 18 that may be appropriately graduated to indicate the variation in thickness of the wedge 8 at the point where the light rays 7 are incident. For obtaining more accurate indications, supplemental scale marks 19 may be provided around the periphery of the wheel 17, cooperating with the lower edge of scale 18.

Due to the extremely small included angle between the faces of the wedge 8, a very much greater movement of the wedge 8 is required than would be required for adjusting the wedge 8 in a direction substantially parallel to the rays 7. This extremely small angle has not been capable of being produced by utilizing prior methods and apparatus. By the aid of the present invention an extremely small angle wedge 8 can be readily produced.

A mechanism for producing the wedge 8 is illustrated in Fig. 4. The plate or support 12 for the wedge 8 is shown as supported within a vacuum chamber 20 formed within a container or vessel 21. This vessel is shown as resting and sealing upon a bottom wall 22 through which there is a vacuum pump connection 23. The plate 12 may first be coated with the layer 11 in a well understood manner. A readily vaporizable transparent material such as quartz may be placed in a container or crucible 24 located within a vacuum chamber 20. This crucible may be heated as by the electrical heating element 25 connecting to an appropriate source of electrical energy 26. Control of the circuit of the heating element 25 may be accomplished by the aid of a switch 27, exterior of vessel 21. The connections to the heating element 25 may be carried out through sealed lead-in devices 28 and 29.

The vaporized quartz is projected in a stream 30 toward the plate 12. However, a screen 31 is interposed between the plate 12 and the stream 30. This screen 31 is so arranged that it may be given a uniform movement transverse to the stream 30, so as to be gradually withdrawn or inserted between the stream 30 and member 12. The shield 31 may be guided for this transverse movement as on the guides 61. Thus for example it may be connected as by a flexible element 32 to a weight 33 passing over the idler pulley 34. Another flexible element 35, attached to the other edge of screen 31 passes over the idler pulley 36, and on to a drum 37. This drum 37 is rotated at a uniform rate by appropriate mechanism 38, such as clock work or the like.

Assuming that the shield 31 is first positioned so as to shield the entire surface of the plate 12, no vaporized quartz is permitted to reach the surface of plate 12. Thereafter upon movement of the shield 31 at a uniform rate toward the right by virtue of the mechanism 38, a quartz layer 39 will be disposed upon the surface of the support 12. The left hand edge of this support 12 will be exposed to the evaporated quartz for the longest interval, and succeeding portions of the support 12 toward the right will be subjected to the vaporized quartz for less and less intervals. If the rate of movement of a shield 31 is properly controlled in accordance with the rate of evaporation of the quartz in crucible 24, the desired extremely small angular wedge can be built up, diminishing to a very narrow edge at the right hand edge of the support 12. When this operation is completed the vacuum may be broken and the container 21 lifted from base 22. By the method described it is possible to obtain a thin quartz film of the order of a few hundreds of molecules in thickness, which may be made uniform as by omitting screen 31. There is no other means known at the present time of accomplishing this extreme thinness.

The system illustrated in Fig. 4 may be utilized to produce the echelon gratings illustrated in Fig. 3 or 8. In Fig. 3 the echelon grating is formed by the transparent member 40, supported upon the support 12. In this instance the mechanism 38 is so operated as to move the shield 31 in a series of discontinuous steps, to produce the stepped formation of the upper surface of the echelon 40. The height between the steps may be made very minute, of the order of only several wave lengths of light. Accordingly, light transmitted as illustrated by the rays 41 through the grating 40 can produce a spectrum of lower order than has been possible with glass echelon gratings formed by conventional optical methods. Therefore the lines of the spectrum are not dispersed to as great an extent as in other forms of echelon gratings, and the resolving power is less. This is of advantage for some types of spectroscopic analysis. Furthermore, due to the continuity of refracting material (the thickness of which is shown greatly exaggerated in Fig. 3) there is less loss by reflection. This is due to the continuity of the material. There are no air-glass surfaces except at the top and bottom.

In the form shown in Fig. 3 the light is intended to be passed through the grating 40 as well as the support 12, which may be made transparent. It is possible, however, to utilize a reflection type of grating such as illustrated in Fig. 8. Here the echelon grating 40 is shown as being overlayed with a layer 42 of reflecting material, such as sputtered metal. In this case the difference in the optical paths for the light 41 is obtained by the distance through air corresponding to the height of the steps.

The wedge 8 of Fig. 1 is shown as having plane bounding surfaces. However, it is not essential to limit the production of wedges bounded by plane surfaces. Instead, a cylindrical wedge such as illustrated in Fig. 5 may be formed. In this case the supporting member 43 is shown as having a cylindrical surface 44. Upon this surface may be disposed the quartz wedge 45 having decreased thickness as the lower edge of the member 43 is approached. Over this surface may be deposited if desired the semitransparent metallic coating 46.

The evaporation of quartz to produce the cylindrical wedge of Fig. 5 may be accomplished by the aid of the apparatus illustrated in Fig. 6. Here the constant speed mechanism 38 is shown as providing a constant angular motion of a circular segment 47, formed as a cage and carrying the cylindrical shield 48. The axis 49 of this shield 48 is made coincident with the axis of the cylindrical surface of the support 43. The support 47 is shown as constantly urged in a counter-clockwise direction by resilient means, such as the spiral spring 50. When the apparatus is at rest the support 47 is engaged by a stop pin 51. If the mechanism 38 is in operation, the shield 48 is rotated at a slow rate in a clockwise direction against the force of the spring 50, permitting the building up of the optical wedge 45 on the gradually exposed surface of the support 43.

In the event that a stepped formation is desired for the surface, the mechanism 30 of Fig. 6 may be given a step-by-step motion. The result is illustrated in Fig. 9.

The capability of depositing extremely thin layers of quartz on a supporting surface may be made use of in connection with interference apparatus, such as illustrated in Fig. 7. In this figure there is illustrated a support 52 which has a spherical reflecting surface 53. Upon this reflecting surface is deposited an extremely thin layer 54, of quartz by the aid of the methods hereinbefore described. This thickness may be such as to cause a half wave length difference of phase, or odd multiple thereof between two reflected portions or rays. It is shown greatly exaggerated in Fig. 7. A semi-transparent metallic reflecting layer 55 is shown as disposed over the quartz layer 54.

Assuming that there is a parallel beam 57 incident upon the structure in a direction parallel to its axis 56, some of the light will pass through the quartz layer 54, and will be reflected from the reflecting surface 53. The rays 58 reflecting from the surface 53 converge to a common point 59 on the axis 56. The rays 60 reflected from the layer 55 also converge substantially at the same point 59. Due to the extreme thinness of the layer 54, these reflected rays 60 may be caused to interfere with the reflected rays 58. In this way the focal point 59 will appear dark.

If the reflecting surfaces 53 and 55 are confined to a very small portion of a sphere, these interfering effects may be obtained by the aid of a uniform thickness of the layer 54.

What is claimed is:

1. The method of forming a cylindrical transparent optical wedge which comprises evaporating a transparent medium, directing the evaporated transparent medium toward a receiving member having a cylindrical surface, and angularly moving a screen across the path of the evaporated medium at a uniform rate about the axis of the surface.

2. The method of producing a curvilinear optical wedge, having a stepped form, which comprises evaporating a transparent medium toward a receiving member having a curved surface, and angularly moving, in a step-by-step manner, a screen about the axis of the curved surface and across the path of the evaporated medium.

THOMAS W. SUKUMLYN.